United States Patent Office 2,860,052
Patented Nov. 11, 1958

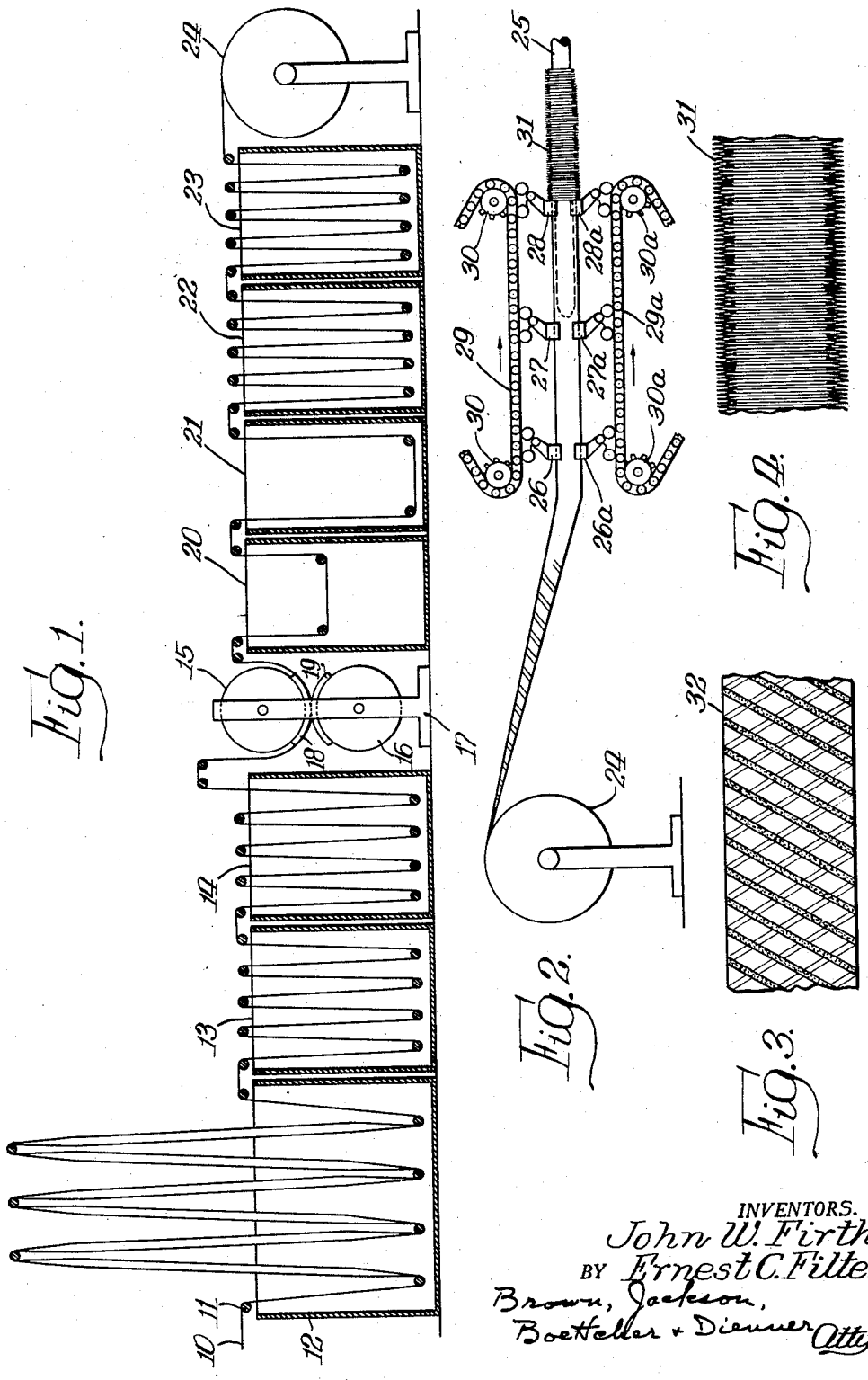

2,860,052

MANUFACTURING SKINLESS FRANKFURTERS AND CASING THEREFOR

John W. Firth and Ernest C. Filter, Chicago, Ill., assignors to Tee-Pak, Inc., Chicago, Ill., a corporation of Illinois Application April 7, 1955, Serial No. 499,846

7 Claims. (Cl. 99—109)

This invention relates to an improved casing material especially adapted for use in the preparation of skinless frankfurters and to a method for preparing such skinless frankfurters.

In recent years high-speed machinery has been introduced into skinless frankfurter production to strip the frankfurter of its regenerated cellulose casing. In operation this machinery draws a long linked strand of wieners under a knife which successively severs the terminal wiener from the strand, that wiener then passing on to be stripped of its casing. As the wieners leave the machine on an endless belt they are cursorily examined by the packer and placed in cartons for marketing. In addition to removing malformed wieners as they leave the machine, the checker must also watch for those wieners which the high speed equipment fails to strip. It can be readily appreciated that this becomes quite a task in view of the fact that the regenerated cellulose casing is either perfectly translucent or intentionally dyed to intensify the red coloration of the encased meat. In either case instant examination is insufficient to insure the complete segregation of all unpeeled wieners.

From the foregoing it can be seen that some marking of the regenerated cellulose casing would call the packer's attention to those wieners that slip through the machine unpeeled. To accomplish this marking various methods have been developed such as ink printing on the surface of the casing or penetrating pigmentation of the regenerated cellulose by pigments such as titanium oxide. The latter, however, interferes with the coloring of the meat during smoking or dyeing and, in addition, the pigments weaken the casing since the particulate pigments are molded into the film during the film-casting operation.

The aforementioned printing of frankfurter casings has been beset by two serious difficulties. Various types of ink that are capable of withstanding the heat and moisture of the smoking and cooking operations have been found to interfere with smoke permeability so that the encased meat is not uniformly colored. Contrarily, aniline inks, which do not reduce smoke permeability, have a definite tendency to rub off during the process of handling of the wieners.

Accordingly, it is an object of this invention to provide an improved casing for frankfurters which is distinctly visible. A further object is to provide a wiener casing having an indelible marking that will withstand the heat and moisture of a cooking operation. A still further object of the invention is to provide a more efficient method of process handling of wieners through the step of stripping the regenerated cellulose casing.

These and other related objects are achieved by the present invention wherein a casing of regenerated cellulose is marked through the interaction of a naphtholate dye and azotized amine color salt and shirred to provide a composite casing for stuffing, dyeing or cooking and high speed stripping of the casing, the efficiency of the high speed stripping being increased by using indelibly marked casings.

Further description and explanation of our invention may be had by reference to the drawings wherein Fig. 1 is a diagrammatic representation of that portion of a process producing a marked casing with Fig. 2 representing the shirring step which completes the processing of the marked casing for use in the stuffing operation.

Fig. 3 represents a portion of a casing with a diagonal striped marking and Fig. 4 represents a completed shirred casing adapted for stuffing.

The process of developing the stirred, indelibly marked casing of this invention has its inception in the steps of acid regeneration of extruded cellulose tubing 10 as shown in Fig. 1 wherein a seamless tubing passes over roller 11 into regenerating acid bath 12 wherein by a series of passes the cellulose tube is regenerated to form a transparent tubing. This tubing is then passed in a collapsed condition through water wash tanks 13 and 14 wherein acid is removed. From tank 14 the regenerated cellulose tubing is led between print rolls 15 and 16 on mount 17 the rolls carrying embossed printing surfaces 18 and 19 respectively, which embossings are schematically shown on only a portion of the print rolls circumferences to indicate an intermittent type of recurring marking and which as seen in Fig. 3 occur at intervals preferably less than the width of the composite casing so that the markings will appear on each of the successive wiener links into which the stuffed casing is subsequently linked in the manufacture of skinless frankfurters. These print rolls are coated with a naphtholate by either a wicking or an offset roll, neither assembly being shown. The illustrated method of using two print rolls achieves a complete final print on both sides of the flattened tubing which is quite essential for purposes of detection during the final stripping check where the indelible marking should appear throughout the circumference of the casing on each wiener length.

The film carrying the naphtholate applied by print rolls 15 and 16 next enters tank 20 in which an azotized amine color salt of the type to be described couples with the naphtholate to form an indelible marking corresponding exactly with the area of the casing to which the naphtholate was applied. In tank 21 unreacted color salts are removed by water washing and the marked casing then moves into tanks 22 and 23 where a hygroscopic substance such as glycerine is used to plasticize the casing with a dry flat width of up to 1.75 inches and a wall thickness of less than 1.5 mils which casing is wound on spool 24.

In Fig. 2 the marked casing is fed from spool 24 and, under the gripping engagement of dogs 26, 27 and 28 driven by chain 29 and sprockets 30 in the direction shown, is passed onto mandrel 25 through which air is forced to maintain the casing in an inflated condition. At a point beyond which the dogs move out of gripping engagement the marked casing is crimped as shown to produce a compact shirred casing 31 which shirred portion is severed in established lengths from the remainder of the casing connected to spool 24.

Fig. 3 represents a segment 32 of a particularly marked casing as would issue from spool 24 and wherein it will be seen that the markings are at intervals much less than the intervals into which the composite casing is eventually linged to form frankfurters. Fig. 4 represents a marked segment after being subjected to crimping to produce the effect shown in Fig. 2 as marked shirred casing 31.

Again referring to Fig. 1, the purpose of water wash tanks 13 and 14 is to remove the excess regenerating acid and soluble acidic products of the regenerating reaction. The removal of such acids is important inasmuch as the naphtholates applied by print rolls 15 and 16 are stable only in an alkaline medium. Print quality based on color intensity is improved by dispersing the selected naphtholate in Cellosolve and then effecting dissolution by the addition of caustic soda. Naphthol solutions were made as concentrated as possible in this way by dispersing 1 g. of naphtholate in 3 ml. of Cellosolve followed by the addition of 1 ml. of 50 percent caustic. Further improvement of dissolution of the naphtholate and ultimate printing quality was had by adding 2 ml. of a wetting agent such as Nullapon.

A run using Naphthol AS–GR (o-toluidide of 2,3-oxyanthracene carboxylic acid; mol. wt. 326) was conducted with the naphtholate bath having the following formation:

| | | |
|---|---|---|
| Naphthol AS–GR | gm. | 20 |
| Cellosolve | ml. | 20 |
| Caustic (50%) | ml. | 3.8 | in which the caustic concentration is calculated on the basis of the molecular weight of the naphthol plus 20 percent excess. As has been indicated, the naphtholate was applied by means of wicking in contact with printing surfaces 18 and 19 of print rolls 15 and 16.

The color salt solutions representing the contents of tank 20 were prepared by dissolving 10 g. of the color salt, 5 g. of sodium chloride and 5 ml. of glacial acetic acid in 50 ml. of water, the latter ingredient serving to acidify the color salt solution. In combination with the Naphthol AS–GR described above a color salt bath having the following make-up was employed.

| | | |
|---|---|---|
| Fast Blue Salt BN | g. | 50 |
| Fast Blue Salt BBN | g. | 50 |
| Glacial acetic acid | ml. | 25 |
| Diazopon | ml. | 15 |
| Sodium chloride | g. | 50 |
| Water, q. s. 1500 ml. | | | in which the wetting agent, Diazopon, keeps the color salts in solution.

The printing surfaces were produced on the print rolls by an etching depth on the order of 0.035" to 0.050" on the zinc plates. The penetration of the naphtholate was satisfactory with a contact time of approximately one-half second. In the color salt bath the casing becomes quite saturated with color salt during the immersion, the penetration of the salts continuing until the casing enters the wash water bath which in this particular installation amounted to eight seconds. This made removal of the color salt quite difficult and therefore a wash cycle of six passes totalling 1.36 minutes through tank 21 followed.

A second run using Naphthol AS–D (o-toluidide 2,3-oxy naphthoic acid; mol. wt. 277) in the following formulation:

| | | |
|---|---|---|
| Naphthol AS–D | g. | 20 |
| Cellosolve | ml. | 25 |
| Caustic (50%) | ml. | 5 | and a color salt bath of the following nature:

| | | |
|---|---|---|
| Blue Salt BN | g. | 100 |
| Glacial acetic acid | ml. | 25 |
| Diazopon | ml. | 15 |
| Sodium chloride | g. | 50 |
| Water, q. s. 1500 ml. | | | was handled in the same manner with good results.

The ideal naphtholate for printing is one which mixes and dissolves easily with a minimum caustic content, which couples quickly with color salt at room temperature and which develops with the color salt a color that contrasts with the reds and oranges of the processed meat emulsions. Similarly, the ideal color salt should have fast coupling with the naphthol at room temperature, should produce a high contrast color with the naphtholate, should not stain the casing and should wash out of the casing rather readily. An example of an undesirable material is Naphthol AS–G which produces a yellow color that does not contrast with the orange of the encased meats. Likewise eliminated is the orange color resulting from the use of Naphthol AS–BN. Naphthol AS–RL has a slow coupling speed that constitutes a limitation on its use. The light purple from Naphthol AS–BR and the light blue of Naphthol AS–E because of their low color intensity produce a reduced color contrast and definition of the marking. In other words constrasting color marking of the casing to distinguish from the red background of the encased meat requires a marking with colors selected from the group consisting of green, blue, purple, brown and black.

In general, Fast Blue Salt BN, which is a stabilized tetrazo compound of dianisidine, is the most satisfactory color salt. Because of a tendency to produce an undesirable brown stain Fast Blue Salt BBN, a stabilized diazo compound of 5-amino-2-benzoylamino-1,4-diethoxybenzene is less satisfactory. A stabilized diazo compound of 4-amino-diphenylamine, commonly called Variamine Blue Salt FG, will couple very slowly with a naphtholate and often completely fails to couple at room temperature so that it is unsatisfactory for the purposes of the present invention.

According to the performance standards described above the following materials of the Naphthol AS class have proven most satisfactory:

| | |
|---|---|
| AS–GR—o-toluidide of 2,3-oxyanthracene carbonylic acid | 326 |
| AS–D—o-toluidide of 2,3-oxynaphthoic acid | 277 |
| AS–LT—p-methoxy-o-toluidide of 2,3-oxynaphthoic acid | 309 |
| AS—anilide of 2,3-oxynaphthoic acid | 263 |
| AS–SW—beta-naphthalide of 2,3-oxynaphthoic acid | 313 |
| AS–BO—alpha-naphthalide of 2,3-oxynaphthoic acid | 313 |

With either Fast Blue Salt BN or BBN all of the foregoing produce a blue color except for AS–GR which develops a green marking that is a very satisfactory contrast with the red and orange of the meat emulsions.

A reversal of the order of applying the color forming reactants is a possible modification of the marking portion of the process. In this arrangement printing of the casing is done with the color salt and the thus printed casing passed through a naphtholate bath to produce the indelible marking. However, it has been found to be complicated by the difficulty in washing out the caustic soda that penetrates the film in the naphtholate bath.

In either method it may be necessary or advisable to introduce a squeeze roll or suitable wiping means at a point just prior to the printing operation so that excessive water will neither interfere with the physical application of the first component to the casing nor dilute the printing solution.

Rather than submerging the printed casing in the second bath to produce a color reaction, the application of the second component can be accomplished through the use of a second set of rolls so as to reduce penetration and need for washing thereafter.

A modification of the described operation exists in the use of commercially available combinations of naphtholate and color salt. These include Rapidogen Black FFM in powder form which can be pasted with Cellosolve and dissolved with an alkali and Rapidogen Blue GN in solution. Of this same order are those dyestuffs known as Diagens, these as well as the Rapidogens being further described in the Technical Dye Handbook. In that these materials are a composite of the naphtholate and color salt, the use of them constitutes a printing of the combination in the form of an alkaline solution which develops color upon being passed through an acid which causes the two to react. These combined naphthols and color salts can be applied as the casing leaves tank 14 after being washed as shown in Fig. 1 of the drawings. Alternatively, they can be printed on an acidic casing such as would issue from tank 13 or shortly after the regenerating acid treatment. At this point the film is quite acid so that the color coupling reaction would occur.

The shirring operation can be accomplished manually or by machine as diagrammatically pictured in Fig. 2. One such mechanical device is described in U. S. Patent 2,583,654. The shirred casing constitutes a very feasible compaction of extremely long lengths of indelibly marked casing, the ration of the original length to shirred length of casing being one the order of 40 to 1.

The improvement in the process of stripping regenerated cellulose casing from wieners covered by this invention increases efficiency of both manual peeling and peeling by the several commercially available peelers. These different devices include the Ty-Peeler covered by U. S. 2,701,385; the Tee-Cee machine of the Tepe Sausage Co.; Kartridge-Pak covered by U. S. 2,689,971; and the Gunderson peeler of U. S. 2,701,387, for example.

Having thus described our invention, we claim:

1. In the process of manufacturing skinless frankfurters which includes the steps of stuffing meat emulsion into a length of regenerated cellulose tubular casing, linking the stuffed casing at regular intervals to form the same into sections of preselected lengths, smoking and cooking said encased meat emulsion, peeling the casing from the sections of smoked and cooked meat emulsion and packing the sections into containers, the improvement which consists in, prior to the step of stuffing meat emulsion into the tubular casing, marking about the exterior of said casing at selected intervals equal to less than the intervals at which the stuffed casing is subsequently linked, said marking being with an indelible dyestuff formed by the interaction of a Naphthol AS and a stabilized tetrazotized salt of dianisidine, which dyestuff is smoke permeable, capable of withstanding the heat and moisture accompanying the cooking of the encased meat emulsion and has a readily and distinctively visible color which contrasts with that of the peeled sections of smoked and cooked meat emulsions whereby those sections which are missed in the peeling step can be identified by the constrasting color of the dyestuff on the regenerated cellulose encasing sections which still encases said unpeeled sections of smoked and cooked meat emulsion.

2. In the process according to claim 1 wherein the marking is formed by the interaction in situ of o-toluidide of 2,3-oxy-anthracene carboxylic acid and the stabilized tetrazo salt of dianisidine.

3. In the process of manufacturing skinless frankfurters which includes the steps of stuffing meat emulsion into a length of regenerated cellulose tubular casing, linking the stuffed casing at regular intervals to form the same into sections of preselected lengths, smoking and cooking said encased meat emulsion, peeling the casing from the sections of smoked and cooked meat emulsion and packing the sections into containers, the improvement which consists in, prior to the step of stuffing meat emulsion into the tubular casing, marking about the exterior of said casing with an indelible dyestuff at selected intervals equal to less than the width thereof, which dyestuff is smoke permeable, capable of withstanding heat and moisture accompanying the cooking of the encased meat emulsion and has a readily and distinctively visible color which contrasts with that of the peeled sections of smoked and cooked meat emulsions whereby those sections which are missed in the peeling step can be identified by the contrasting color of the dyestuff on the regenerated cellulose encasing sections which still encases said unpeeled sections of smoked and cooked meat emulsion.

4. Casing for use in skinless frankfurter preparation comprising shirred seamless tubing of plasticized regenerated cellulose having an average wall thickness in the dry state of less than 1.5 mils, said tubing having distinctively visible indelible markings about the exterior surface thereof spaced at regular intervals equal to less than the length of the frankfurters to be prepared therewith, said markings consisting of the interaction in situ of a Naphthol AS and a tetrazotized salt of dianisidine, said dyestuff being smoke permeable, capable of withstanding the heat and moisture which accompanies the cooking of the meat emulsion which is stuffed into the casing in the preparation of frankfurters, and having a color which distinctively contrasts with that of the smoked and cooked meat emulsion.

5. Casing according to claim 4 wherein the markings comprise stripes which extend diagonally to the axis of the tubing.

6. Casing according to claim 4 wherein the markings are interaction in situ of o-toluidide of 2,3-oxyanthracene carboxylic acid and the stabilized tetrazo salt of dianisidine.

7. Casing for use in skinless frankfurter preparation comprising shirred seamless tubing of plasticized regenerated cellulose having an average wall thickness in the dry state of less than 1.5 mils, said tubing having a diameter sized in accordance with frankfurters to be formed therewith and a length several times that of said frankfurters, said tubing being provided with distinctively visible indelible markings about the exterior surface thereof spaced longitudinal thereof at regular intervals equal to less than its shorter dimension, said dyestuff markings being smoke permeable, capable of withstanding the heat and moisture which accompanies the cooking of the meat emulsion which is stuffed into the casing in the preparation of frankfurters, and having a color which distinctively contrasts with that of the smoke and cooked meat emulsion.

References Cited in the file of this patent

UNITED STATES PATENTS

| | | |
|---|---|---|
| 1,959,980 | Henderson et al. | May 22, 1934 |
| 1,997,769 | Fletcher | Apr. 16, 1935 |
| 2,477,768 | Remer | Aug. 2, 1949 |

OTHER REFERENCES

"The Chemistry of Synthetic Dyes," 1952, vol. I, by K. Venkataraman; published by Academic Press Inc., Publishers, New York; pp. 688 to 695, inclusive, article entitled "Azoic Colors in Printing."